US012791440B2

(12) United States Patent
Hafellner et al.

(10) Patent No.: US 12,791,440 B2
(45) Date of Patent: Nov. 10, 2026

(54) DUMMY VEHICLE COMPRISING A SENSOR-SENSITIVE LAYER

(71) Applicant: 4ACTIVESYSTEMS GMBH, Traboch (AT)

(72) Inventors: Reinhard Hafellner, Spielberg (AT); Martin Fritz, Kobenz (AT); Thomas Wimmer, Traboch (AT)

(73) Assignee: 4ACTIVESYSTEMS GMBH, Traboch (AT)

( * ) Notice: Subject to any disclaimer, the term of this patent is extended or adjusted under 35 U.S.C. 154(b) by 898 days.

(21) Appl. No.: 17/614,426

(22) PCT Filed: Jun. 2, 2020

(86) PCT No.: PCT/EP2020/065209

§ 371 (c)(1),
(2) Date: Nov. 26, 2021

(87) PCT Pub. No.: WO2020/245112

PCT Pub. Date: Dec. 10, 2020

(65) Prior Publication Data

US 2022/0244141 A1 Aug. 4, 2022

(30) Foreign Application Priority Data

Jun. 4, 2019 (DE) ..................... 10 2019 115 016.7

(51) Int. Cl.
*G01M 17/007* (2006.01)
*B60T 7/22* (2006.01)

(52) U.S. Cl.
CPC ................................. *G01M 17/007* (2013.01)

(58) Field of Classification Search
None
See application file for complete search history.

(56) References Cited

U.S. PATENT DOCUMENTS 4,659,089 A * 4/1987 Rosa .......................... F41J 2/02 342/9
9,355,576 B2 5/2016 Fritz
(Continued)

FOREIGN PATENT DOCUMENTS

DE 102014117014 5/2016
DE 102014117014 A1 * 5/2016
(Continued)

OTHER PUBLICATIONS

Title: A brief insight into the basics of radar technology and radar sensors; URL: https://ondosense.com/en/radar-know-how-optimal-use-of-radar-sensors/how-radar-works-what-radar-sensors-can-do/#:~:text=With%20a%20radar%2C%20it%20is,films%2C%20they%20are%20fully%20reflected (Year: 2024).*
(Continued)

*Primary Examiner* — Douglas X Rodriguez
*Assistant Examiner* — Ruben C Parco, Jr.
(74) *Attorney, Agent, or Firm* — Robert A. Blaha; Smith Tempel Blaha LLC

(57) ABSTRACT

The present invention relates to a dummy vehicle for performing tests for driver assistance systems. The dummy vehicle comprises a vehicle element reproducing a part of a vehicle to be simulated. The vehicle element forms a shell structure, wherein the shell structure comprises an outer layer and an inner layer. The outer layer arranged further outwardly in the shell structure than the inner layer. The outer layer is transparent to sensor signals from sensors of the driver assistance system, and the inner layer is designed to be sensor-sensitive to sensor signals from sensors of the driver assistance system.

17 Claims, 1 Drawing Sheet

(56) References Cited

U.S. PATENT DOCUMENTS

| | | | | |
|---|---|---|---|---|
| 9,870,722 | B2 | 1/2018 | Fritz et al. | |
| 10,352,826 | B2 | 7/2019 | Fritz et al. | |
| 10,955,313 | B2 | 3/2021 | Hafellner et al. | |
| 11,092,515 | B2 | 8/2021 | Hafellner et al. | |
| 11,125,651 | B2 | 9/2021 | Hafellner et al. | |
| 2014/0102224 | A1 | 4/2014 | Fritz | |
| 2015/0188233 | A1 | 7/2015 | Chen et al. | |
| 2015/0317917 | A1 | 11/2015 | Fritz et al. | |
| 2016/0054199 | A1 | 2/2016 | Fritz et al. | |
| 2016/0356674 | A1 | 12/2016 | Chien et al. | |
| 2017/0315022 | A1* | 11/2017 | Simader | F21V 33/00 |
| 2018/0010984 | A1 | 1/2018 | Silberling et al. | |
| 2018/0306676 | A1 | 10/2018 | Wimmer | |
| 2019/0219486 | A1 | 7/2019 | Hafellner et al. | |
| 2019/0257717 | A1 | 8/2019 | Hafellner et al. | |
| 2020/0003658 | A1 | 1/2020 | Hafellner et al. | |

FOREIGN PATENT DOCUMENTS

| | | | | |
|---|---|---|---|---|
| DE | 112014006027 | | 10/2016 | |
| DE | 102016112518 | | 1/2018 | |
| DE | 102016112518 | A1 * | 1/2018 | G01M 17/0078 |
| EP | 3306430 | | 4/2018 | |
| JP | 3204691 | U | 6/2016 | |
| JP | 2017203770 | A | 11/2017 | |
| WO | 2018146346 | | 8/2018 | |

OTHER PUBLICATIONS

Title: Electrical Insulation and Radar-Wave Absorption Performances of NanoferriteLiquid-Silicone-Rubber Composites; Pertinent pp. 1-2; URL: https://www.mdpi.com/1422-0067/23/18/10424#:~:text=Figure%201.,wave%20response%20and%20reflection%20characteristics. (Year: 2022).*

Title: Protecting Signal Strength Using Polyurethane Foam; Pertinent pp. 1-2; URL: https://www.azom.com/article.aspx?ArticleID=13870 (Year: 2017).*

Title: Low-Density Polyethylene (LDPE); Pertinent p. Page 3 teaches that LDPE is an insulator; URL: https://www.nexeoplastics.com/types/polythylene/ldpe/#:~:text=Cable%20Insulation%3A%20LDPE%20is%20used,to%20its%20electrical%20insulating%20properties. (Year: 2024).*

Internationalen Recherchengerichts und des Schriftlichen Bescheids der Internationalen Recherchenbehörde Oder der Erklärung (International Search Report); Internationale Recherchenbehörde; Aug. 26, 2020.

Advanced Testing Technologies for Active Safety Systems To Reduce Road Fatalities; 4activeSystems (brochure); www.4activesystems.at; www.youtube.com/4activesystems; Jun. 8, 2017.

Abstract of DE 10 2016 112 518; machine translation; Espacenet; Jan. 11, 2018.

Abstract of DE 10 2014 117 014; machine translation; Espacenet; May 25, 2016.

Abstract of DE 11 2014 006 027; machine translation; Espacenet; Oct. 20, 2016.

Machine Translation of WO 2018146346, Published Aug. 16, 2018—Centro de Experimentacion.

PCT/EP2020/065209, Written Opinion of International Searching Authority EP/RO Aug. 27, 2020.

Yamaguchi, T.; Notice of Reasons for Refusal Application No. 2021-562935; pp. 1-3; Dec. 1, 2023; Japan Patent Office; 3-4-3 Kasumigaseki, Chiyoda-ku, Tokyo 100-8915, Japan.

Yamaguchi, T.; (English Translation) Notice of Reasons for Refusal Application No. 2021-562935; pp. 1-7; Dec. 1, 2023; Japan Patent Office; 3-4-3 Kasumigaseki, Chiyoda-ku, Tokyo 100-8915, Japan.

Demma F. et al.; Laser Radar Cross-Section and Reflectivity Measurements at .48, .63, and 10.6 Microns, pp. 1-47, Nov. 1971, RADC-TR071-245, Rome Air Development Center, Air Force Systems Command, Griffis Air Force Base, New York.

Tan, X. et al.; Radar Target Radar Cross-Section Measurement Based on Enhanced Imaging and Scattering Center Extraction, pp. 1-24; Sep. 29, 2024; Sensors 2024, vol. 24, 6315 https://doi.org/10.3390/s24196315.

* cited by examiner

DUMMY VEHICLE COMPRISING A SENSOR-SENSITIVE LAYER

This application is the U.S. national phase of International Application No. PCT/EP2020/065209 filed 2 Jun. 2020 which designated the U.S. and claims priority to German Patent Application No. 10 2019 115 016.7 filed 4 Jun. 2019, the entire contents of each of which are hereby incorporated herein by reference.

TECHNICAL FIELD

Embodiments of the present invention relate to a dummy vehicle for performing tests for driver assistance systems.

BACKGROUND

Vehicle dummies are often used to test driver assistance systems for vehicles, such as motorcycle dummies or car dummies. Such vehicle dummies resemble, in at least one aspect or characteristic, the vehicles that the vehicle dummies are intended to simulate. For example, vehicle dummies may have a similar geometric shape or size as the objects to be simulated.

Collisions or near-collision situations cannot be avoided in many tests of driver assistance systems and are often even desired in order to investigate extreme situations or also to train driver assistance systems. The vehicle dummies should remain as non-destructive as possible after collisions so that they may be used for several test runs. In addition, the vehicle dummies should be inexpensive to manufacture and still realistically simulate the vehicles to be simulated.

DESCRIPTION OF THE INVENTION

There may be a need to provide a vehicle dummy which, in short or despite of a simple structure, realistically simulates a vehicle to be simulated.

This need may be met by a vehicle dummy for performing tests for driver assistance systems according to the independent claim.

According to a first aspect of the present invention, a dummy vehicle for performing tests for driver assistance systems is provided. The dummy vehicle comprises a vehicle element reproducing (representing) a part (portion) of a vehicle to be simulated. The vehicle element forms a shell structure (envelope structure), the shell structure comprising an outer layer and an inner layer. The outer layer is arranged (disposed) in the shell structure further outwardly (towards the surroundings of the vehicle element) than the inner layer. The outer layer is transparent to (for) sensor signals from sensors of the driver assistance system and the inner layer is designed to be sensor-sensitive to sensor signals from sensors of the driver assistance system.

Accordingly, in accordance with a further aspect, the invention relates to a method for performing tests for driver assistance systems using the dummy vehicle described above.

A driver assistance system describes a system that supports the driver of a vehicle, for example a motor vehicle, in driving the vehicle. Driver assistance systems may also be used in autonomous vehicles in which vehicle guidance is taken over completely or almost completely by an autonomous system, for example a system supported by artificial intelligence, in particular a corresponding computer software. Driver assistance systems are, for example, emergency brake assistants, lane change assistants, parking assistants, distance control systems, traffic sign assistants or night vision assistants.

Driver assistance systems may have sensors, in particular radar sensors or temperature sensors, with which they receive sensor signals from the surroundings. With the aid of an evaluation of such received sensor signals, they may detect aspects of the surroundings, in particular properties of various objects, such as other vehicles, in the surroundings. Such properties may be, for example, distances, geometric dimensions, temperatures or speeds of other vehicles. Speeds may be determined relative to the surroundings, for example relative to a road, or relative to a vehicle with the driver assistance system. Objects may have an overall velocity or center of gravity velocity, but parts of the object may also be movable in any manner relative to each other and relative to the center of gravity movement. Driver assistance systems may also include transmitters of signals that are modified by the surroundings in a characteristic manner so as to be then at least partially received by the sensors, for example transmitters of radar waves. In particular, sensor signals may be emitted which penetrate the outer layer and are then exclusively reflected by the inner layer. Sensor signals may thereby be electromagnetic radiation, such as radar waves, radio waves or microwaves, thermal radiation, light, X-rays or infrared radiation.

In a test of a driver assistance system, a vehicle may be equipped with the driver assistance system. The vehicle so equipped may be confronted with predetermined situations on a test track, where the reaction of the driver assistance system to a predetermined situation is observed and assessed according to predetermined criteria. Driver assistance systems may also be tested without being installed in a vehicle.

A vehicle to be simulated is a movable vehicle. A vehicle is understood to be, for example, a two-wheeler, in particular a bicycle or a motorcycle, a passenger car, a truck or any other moving vehicle that is to be detected by driver assistance systems.

The dummy vehicle according to the invention reproduces the vehicle to be simulated. In particular, the dummy vehicle is perceptible or detectable by the sensors, such as temperature sensors or radar sensors, of the driver assistance system. The dummy vehicle may move in the surroundings of the vehicle in which the driver assistance system is installed.

The dummy vehicle according to the invention comprises at least one vehicle element or a plurality of different vehicle elements. A vehicle element forms a part of the vehicle to be simulated. For example, a vehicle element may form a part of a door, a frame part or a vehicle body part. In particular, the vehicle element forms a part of the vehicle to be simulated which, for example, has metallic structures or reflects radar waves. For example, the vehicle element forms a vehicle body part, such as a door, an engine hood or even internal structures, such as an engine block.

In particular, the vehicle element has a shell structure comprising an outer structure or outer layer and an inner structure or inner layer. The outer layer is external to the surroundings of the vehicle element compared to the inner layer. In addition to the inner layer and the outer layer, the shell structure may further comprise a plurality of additional layers. For example, a plurality of layers may be located between the outer layer and the inner layer. Thus, the inner layer is spaced apart from the outer layer. The inner layer may also be attached directly to the outer layer on the inside. Moreover, further layers may be attached to the outer layer on the outside and correspondingly further layers may be attached to the inner layer on the inside. In an exemplary embodiment, the outer layer may be that layer of the shell structure that is in contact with the surroundings of the vehicle element. The inner layer may be the layer of the shell structure that is in contact with an inner cavity.

The outer layer is formed in particular from a lightweight foam material which is, for example, elastic and dimensionally stable. The foam material is in particular designed in such a way that the vehicle element is self-supporting. The outer layer is thereby transparent to sensor signals from sensors. In other words, the outer layer is almost completely permeable to the sensor signals, or does not affect them when they pass through the outer layer. In particular, the outer layer is formed in such a way that there is no interference with the sensor signals that may be perceived by sensors.

The outer layer is more robust, i.e. stiffer and harder, than the inner layer. The outer layer thus serves on the one hand for the dimensional stability of the vehicle element and on the other hand for the protection of the inner layer, in particular in the event of a collision of the dummy vehicle.

In order to make the vehicle element visible to sensors, the inner layer comprising a sensor-sensitive material is provided on the inside with respect to the outer layer. In particular, the inner layer does not contribute to the dimensional stability of the vehicle element, but may, for example, be flexible. The inner layer may, for example, emit radiation as sensor signals, for example temperature radiation. For example, a signal generator, such as a heat source, for sensor signals may be arranged in the vehicle element, with the inner layer emitting this thermal radiation to the outside. For example, an engine block of a vehicle may be simulated. Alternatively, in the case of a vehicle body part as a vehicle element, the inner layer may be reflective for signal waves. For example, the inner layer may be radar wave reflective or reflective for other electromagnetic waves. Accordingly, sensor-sensitive means that the inner layer forms a radiation-emitting layer, radiation-absorbing layer and/or radiation-reflecting layer.

With the combination of the sensor-transparent outer layer and the internal sensor-sensitive inner layer, a lightweight and dimensionally stable vehicle element of a dummy vehicle may be provided, which is robustly designed so that the sensitive sensor-sensitive layers are not destroyed in a collision. Thus, the dummy vehicle may be used several times for collision tests.

For example, in conventional vehicle dummies, radar-reflective elements are attached to the outer skin of the dummy vehicle at specific positions. This may result in damage to the radar-reflective elements in the event of a collision with another vehicle. Due to the shell structure according to the invention, the internal sensor-sensitive, or radar-reflective, inner layer is protected from collisions at the outer layer. Above all, the coalition partner, i.e. the vehicle under test or its occupants, is protected. As a result, the sensitive or more expensive sensor-sensitive inner layer may be made thinner or less collision-resistant, for example, so that less expensive sensor-sensitive materials may be used.

According to another exemplary embodiment, the shell structure forms a hollow body having an internal volume.

According to another exemplary embodiment, the shell structure comprises a filler material around which the inner layer is placed or extends. The internal volume may, for example, be formed with a foam material or another light material and thus increase the stability. The inner layer, which is sensor-sensitive, may thereby directly abut the filler material or further layers may be arranged between the inner layer and the filler material.

According to another exemplary embodiment, the inner layer comprises a thermally reflective material.

According to another exemplary embodiment, the inner layer is heatable. For example, wires may run in the inner layer so that resistance heating is implemented. Furthermore, the inner layer may be heated by means of a tempering medium.

According to another exemplary embodiment, the inner layer comprises a radar-reflective material. For example, the inner layer may be formed as a metallic foil. Furthermore, the inner layer may comprise a metallic mesh structure.

According to another exemplary embodiment, the outer layer is radar transparent.

According to another exemplary embodiment, the outer layer consists of a foam material. For example, the outer layer may consist of rigid foam or an elastic foam material so that dimensional stability is achieved at low weight.

According to an exemplary embodiment of the present invention, the outer layer is electrically non-conductive. In other words, the material may be electrically insulating and correspondingly non-conductive so that radar wave reflection is enabled exclusively by the radar-reflective inner layer.

According to a further exemplary embodiment, the thickness of the outer layer and the thickness of the inner layer are such that the area of the inner surface is at least 70% of the outer surface, in particular 80% to 90% of the outer surface. Compared to real parts of a vehicle to be simulated, the vehicle element has a smaller radar-reflective outer surface, since the reflective inner layer is on the inside and the radar-wave-permeable outer layer does not reflect parabolas. If a part of the vehicle to be simulated is now simulated with a vehicle element according to the present invention in a size ratio of 1:1, the surface area of the radar-reflective (or radar-wave-permeable) outer layer of the part of the vehicle to be simulated is larger than the surface area of the radar-reflective inner layer of the vehicle element.

It has been found that due to the low resolution of the radar sensors in vehicle assistance systems, the area of the inner surface of the inner layer may be 70% of the area of the outer surface of the outer layer, with the radar sensors still providing a correct identification of the vehicle element as a corresponding part of the isolating vehicle. Thus, it is not necessary to increase the external dimensions of the vehicle element relative to the part of the vehicle to be simulated to thereby obtain an identical surface area to the external surface of the part. In other words, in the embodiments described above, the external dimensions of the vehicle element are maintained without causing a mismeasurement of the driver assistance systems due to the reduced area of the radar-reflective inner layer.

According to another exemplary embodiment, the thickness of the outer layer is about 0.1 cm (centimeter) or 0.5 cm to 30 cm, in particular 2 to 15 cm, more particularly 5 cm to 10 cm. In other words, the thickness of the outer layer is, for example, less than 20 cm, in particular less than 10 cm or 5 cm.

According to another exemplary embodiment, the inner layer is formed as a foil. The foil may, for example, have a thickness of less than 0.4 cm, in particular less than 0.1 cm.

According to another exemplary embodiment, the inner layer is electrically conductive.

According to another exemplary embodiment, the inner layer is a metallic layer. For example, the inner layer may be formed as a metallic foil. Further, the metallic layer may comprise a mesh of metallic wires. For example, the metal devices or metallic wires may be embedded in a support matrix comprising, for example, a non-conductive material. Alternatively, in a corresponding exemplary embodiment, electrically conductive specific metallic particles may be embedded in the support matrix.

According to another exemplary embodiment, the outer layer is formed of plastic, in particular polyvinyl chloride, polyolefin materials (polyethylene, polypropylene) or polyurethane.

In particular, the outer layer may be made of a foamed material. The volume weight or bulk density of the outer layer may be, for example, 15 to 150 kg/m$^3$.

According to a further exemplary embodiment, an optical layer, in particular a film or a foil, is applied to the outer layer. The optical layer may be applied, for example, as a film or as a paint. For example, the optical layer optically simulates elements on the outer surface vehicle element, such as wheels, windows or headlights. The optical layer consists of, for example, polyvinyl chloride or polyurethane.

According to another exemplary embodiment, the dummy vehicle comprises a coupling member (coupling element) for coupling to a platform movable on the ground. The movable platform may, for example, be individually controlled along a travel path on the ground. The dummy vehicle may be releasably coupled to this movable platform by means of the coupling member, which may for example be a mechanical or magnetic coupling member.

According to a further exemplary embodiment, the dummy vehicle comprises a further vehicle element which is free of a radar-reflective layer. The further vehicle element may, for example, adjoin the vehicle element having the radar-reflective layer so that the vehicle element and the further vehicle element together form the hollow body. Alternatively, the vehicle element and the further vehicle element may form separate hollow bodies.

The further vehicle element reproduces, for example, a part of the vehicle to be simulated which also has no or hardly any radar-reflective properties. For example, the further vehicle element may reproduce a window area or a tire area of a dummy vehicle.

According to another exemplary embodiment, the vehicle element and the further vehicle element are integrally formed. For example, the vehicle element and the further vehicle element may be manufactured together from a foam material, wherein no radar-reflective inner layer is provided in the region of the further vehicle element.

The dummy vehicle according to the invention may comprise a plurality of vehicle elements with a radar-reflective inner layer and a plurality of further vehicle elements without a radar-reflective layer for simulating the vehicle to be simulated.

It should be noted that the embodiments described herein represent only a limited selection of possible embodiments of the invention. Thus, it is possible to combine the features of individual embodiments in a suitable manner, so that a plurality of different embodiments is to be regarded as obviously disclosed to the person skilled in the art with the embodiments made explicit herein. In particular, some embodiments of the invention are described with device claims and other embodiments of the invention are described with method claims. However, it will immediately become apparent to the person skilled in the art upon reading this application that, unless explicitly stated otherwise, in addition to a combination of features belonging to one type of subject matter of the invention, any combination of features belonging to different types of subject matter of the invention is also possible.

BRIEF DESCRIPTION OF THE DRAWINGS

In the following, for further explanation and for a better understanding of the present invention, embodiments are described in more detail with reference to the accompanying drawings.

DETAILED DESCRIPTION OF EXEMPLARY EMBODIMENTS

Figure 1:
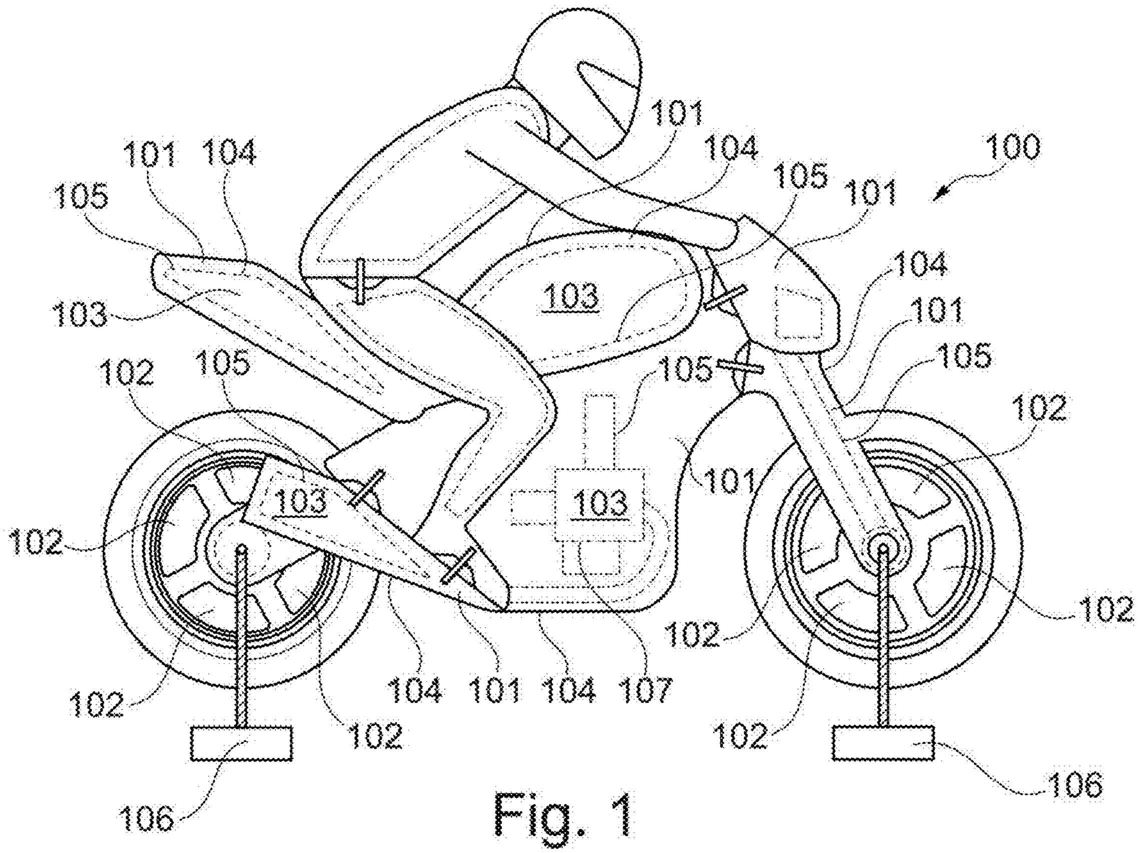
FIG. 1 is a schematic illustration of a dummy vehicle for simulating a motorcycle in accordance with an exemplary embodiment of the present invention.

The same or similar components in different figures are provided with the same reference numerals. The illustrations in the figures are schematic.

FIG. 1 shows a dummy vehicle 100 in the form of a motorcycle for performing tests for driver assistance systems according to an exemplary embodiment of the present invention. The dummy vehicle 100 comprises a vehicle element 101 which reproduces a part of a vehicle to be simulated. The vehicle element 101 forms a shell structure 103, the shell structure having an outer layer and an inner layer. The outer layer is arranged further outwardly in the shell structure 103 than the inner layer 105. The outer layer is transparent 104 to sensor signals from sensors of the driver assistance system, wherein the inner layer 105 is sensor-sensitive to sensor signals from sensors of the driver assistance system.

In the exemplary embodiment shown in FIG. 1, the shell structure forms a hollow body 103, the shell structure having an outer layer 104 and an inner layer 105.

The dummy vehicle 100 according to the invention reproduces the motorcycle to be simulated. In particular, the dummy vehicle 100 is perceptible or detectable by the radar sensors of the driver assistance system of another vehicle. The dummy vehicle 100 may move in the surroundings of the vehicle in which the driver assistance system is installed.

The dummy vehicle 100 according to the invention comprises several different vehicle elements 101. Each vehicle element 101 reproduces a part of the vehicle to be simulated. For example, a vehicle element 101 may reproduce a longitudinal axis, a tank, an engine block, a seat or a base frame of the motorcycle to be simulated. In particular, the vehicle elements 101 reproduce parts of the motorcycle to be simulated which, for example, have metallic structures and reflect radar waves, for example.

The inner layer 105 is the layer of the shell structure that is in contact with the cavity 103. The inner layer 105 is shown in dashed manner in FIG. 1.

The outer layer 104 is in particular formed from a lightweight foam material which is, for example, elastic and dimensionally stable. The foam material is in particular formed such that the vehicle element 101 is self-supporting.

On the inside of the outer layer 104, the inner layer 105 is provided with a sensor-sensitive, for example radar-reflective, material. In particular, the inner layer 105 does not contribute to the dimensional stability of the vehicle element 101 but may for example be flexible.

The outer layer 104 is electrically non-conductive. In other words, the material may be electrically insulating and correspondingly non-conductive so that the radar wave reflection is enabled exclusively by the radar-reflective inner layer 105.

As shown in FIG. 1, the thickness of the outer layer 104 and the thickness of the inner layer 105 are such that the area of the inner surface is at least 70% of the outer surface, in particular 80% to 90% of the outer surface.

The inner layer 105 is electrically conductive. The inner layer 100 is in particular a metallic layer. For example, the inner layer 105 may be a metallic foil. The outer layer 104 is formed of, for example, rigid foam, such as polyvinyl chloride, polyphenil or polyurethane.

The dummy vehicle 100 further comprises a coupling member 106 for coupling to a platform movable on the ground. The movable platform (not shown) may be individually controlled along a path of travel on the ground, for example.

Moreover, further vehicle elements 102 are shown which are free of a radar-reflective layer. For example, the further vehicle element 102 may adjoin the vehicle element 101 having the radar-reflective layer so that the vehicle element 101 and the further vehicle element 102 together form the hollow body 103. Alternatively, the vehicle element 101 and the further vehicle element 102 may form separate hollow bodies.

For example, the further vehicle element 102 reproduces a part of the vehicle to be simulated which also has no or hardly any radar-reflective properties. For example, the further vehicle element 102 may represent openings in the rim of the motorcycle as shown in FIG. 1.

Further, the vehicle element 101 may include a cavity 103 that simulates specific shapes of a metallic component of a vehicle to be stimulated. For example, in FIG. 1, an engine block 107 is simulated by means of a cavity 103 in the base frame of a vehicle element 101 of the motorcycle shown. In this regard, the cavity 103 has the specific shape of the engine block 107. On the inside, the inner layer 105, which has radar-reflective properties, surrounds the cavity 103 and thus replicates the shape of the engine block 107. For example, the inner layer 105 may emit radiation as sensor signals, such as temperature radiation. For example, a generator, such as a heat source, of sensor signals may be arranged in the vehicle element 101, with the inner layer 105 emitting such thermal radiation to the outside. For example, an engine block 107 of a vehicle may be simulated.

Thus, with the formation of the shell structure, for example, a solid body representing the outer layer may be formed in which a cavity corresponding to the shape of an object to be simulated is formed. The inner layer is arranged around the cavity on the outer layer so that, for example, radar-reflective inner components of the vehicle, such as an engine block, may also be simulated in addition to the outer geometry of a vehicle element.

Figure 2:
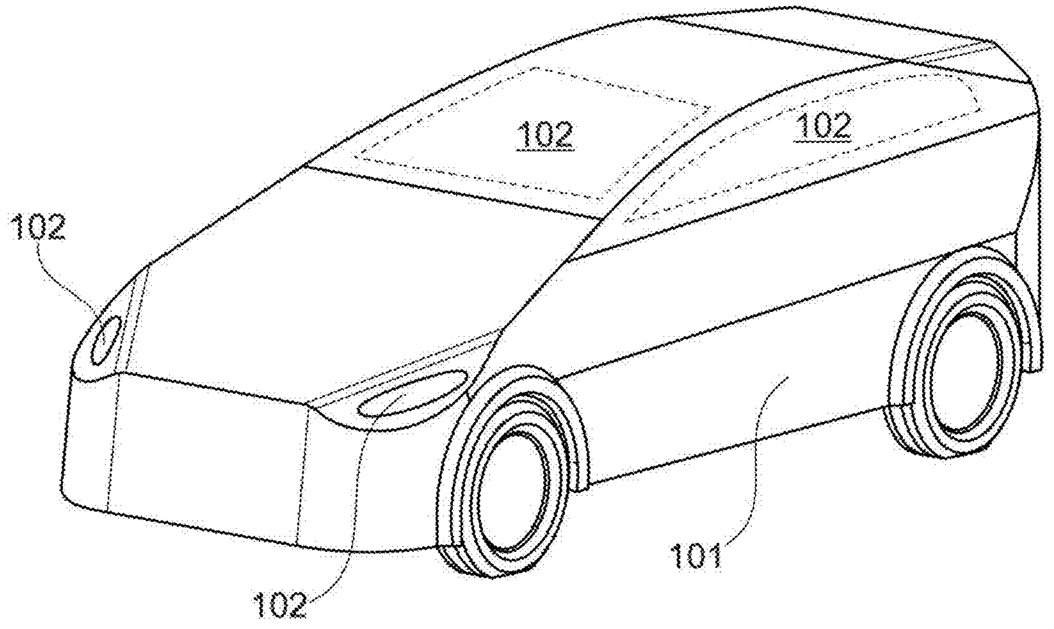
FIG. 2 is a schematic illustration of a dummy vehicle for simulating an automobile according to an exemplary embodiment of the present invention.

FIG. 2 shows a dummy vehicle 100 in the form of an automobile. The dummy vehicle 100 shown has several different vehicle elements 101. Each vehicle element 101 reproduces a part of the automobile to be simulated. For example, a vehicle element 101 may reproduce an engine hood, vehicle body, or door of the automobile to be simulated. In particular, the vehicle elements 101 comprising the radar-reflective inner layer 105 reproduce parts of the automobile to be simulated which, for example, comprise metallic structures or reflect radar waves.

Further, regions of the vehicle dummy 100 are shown that represent further vehicle elements 102. The further vehicle elements 102 reproduce, for example, window areas or headlights of the automobile to be simulated. In this regard, the vehicle elements 102 have no radar-reflective or a barely radar-reflective inner layers 105.

The vehicle elements 101 and the further vehicle elements 102 may be integrally formed. For example, the vehicle element 101 and the further vehicle element 102 may be formed together from a foam material, wherein no radar-reflective inner layer 105 is provided in the region of the further vehicle element 102.

Supplementally, it should be noted that "comprising" does not exclude other elements or steps and "a" or "an" does not exclude a plurality. It should further be noted that features or steps that have been described with reference to any of the above embodiments may also be used in combination with other features or steps of other embodiments described above. Reference signs in the claims are not to be regarded as a limitation.

LIST OF REFERENCE SIGNS

100 Dummy vehicle
101 Vehicle element
102 Further vehicle element
103 Hollow body
104 Outer layer
105 Inner layer
106 Coupling member
107 Engine block

The invention claimed is:

1. A dummy vehicle for performing tests for driver assistance systems, the dummy vehicle comprising:
- a vehicle element reproducing a part of a vehicle to be simulated,
- wherein the vehicle element forms a shell structure,
- wherein the shell structure comprises an outer layer and an inner layer,
- wherein the outer layer is self-supporting and dimensionally stable and arranged further outwardly in the shell structure than the inner layer,
- wherein the outer layer is transparent to sensor signals from sensors of the driver assistance system,
- wherein the inner layer is sensor sensitive to sensor signals from sensors of the driver assistance system;
- wherein the outer layer has a thickness between 0.5 cm and 30 cm;
- wherein the thickness of the outer layer and the thickness of the inner layer are such that the surface area of the inner surface of the inner layer is at least 70% of the surface area of the outer surface of the outer layer.

2. The dummy vehicle according to claim 1,
wherein the shell structure forms a hollow body having an internal volume.

3. The dummy vehicle according to claim 1,
wherein the inner layer comprises a thermally reflective material.

4. The dummy vehicle according to claim 1,
wherein the inner layer is heatable.

5. The dummy vehicle according to claim 1,
wherein the inner layer comprises a radar-reflective material; and/or
wherein the outer layer is radar transparent.

6. The dummy vehicle according to claim 1,
wherein the outer layer consists of a foam material; and/or
wherein the outer layer is electrically non-conductive.

7. The dummy vehicle according to claim 1,
wherein the inner layer is formed as a foil.

8. The dummy vehicle according to claim 1,
wherein the inner layer is electrically conductive.

9. The dummy vehicle according to claim 1,
wherein the inner layer forms a metallic layer.

10. The dummy vehicle according to claim 1,
wherein the outer layer is formed of polyvinyl chloride, polyolefin materials or polyurethane.

11. The dummy vehicle according to claim 1,
wherein an optical layer is applied to the outer layer.

12. The dummy vehicle according to claim 11,
wherein an optical layer consists of polyvinyl chloride or polyurethane.

13. The dummy vehicle according to claim 1, further comprising:
a further vehicle element which is free of a radar-reflective layer.

14. The dummy vehicle according to claim 13,
wherein the further vehicle element reproduces a window area of a further part of the vehicle to be simulated.

15. The dummy vehicle according to claim 13,
wherein the vehicle element and the further vehicle element are integrally formed.

16. The dummy vehicle according to claim 13,
wherein the further vehicle element has a further shell structure which, together with the shell structure of the vehicle element, forms the hollow body.

17. The dummy vehicle according to claim 1, such that the surface area of the inner surface of the inner layer is in a range of 70% to 90% of the surface area of the outer surface of the outer layer such the vehicle element is correctly identified by the driver assistance system as the corresponding part of the vehicle to be simulated while maintaining the external dimensions of the vehicle element without causing a misidentification by the driver assistance system due to the reduced area of the inner layer, wherein the outer layer is more dimensional stable than the inner layer, and wherein the inner layer is flexible.

* * * * *